US005101802A

United States Patent [19]

Reinhard

[11] Patent Number: 5,101,802

[45] Date of Patent: Apr. 7, 1992

[54] SPARK IGNITION SAFETY CIRCUIT

[75] Inventor: Gerald J. Reinhard, Brillion, Wis.

[73] Assignee: Ariens Company, Brillion, Wis.

[21] Appl. No.: 922,231

[22] Filed: Oct. 23, 1986

[51] Int. Cl.⁵ ........................ F02N 11/10; F02P 11/00; B60K 28/04

[52] U.S. Cl. ............................ 123/630; 123/198 DC; 123/179.5; 123/179.23; 180/273; 307/10.6

[58] Field of Search ........... 123/179 K, 179 A, 179 B, 123/179 BG, 630, 198 DC; 180/273; 307/10 SB, 10.6; 56/10.5

[56] References Cited

U.S. PATENT DOCUMENTS

| | | | |
|---|---|---|---|
| 2,791,207 | 5/1957 | Rayniak | 123/198 DC |
| 3,500,946 | 3/1970 | Boyajian | 180/273 |
| 3,726,265 | 4/1973 | Howard | 123/179 K |
| 3,783,216 | 1/1974 | Plamper et al. | 123/179 K |
| 4,022,180 | 5/1977 | Bosma | 123/198 DC |
| 4,128,082 | 12/1978 | Aoki | 123/179 BG |
| 4,173,961 | 11/1979 | Howard | 123/650 |
| 4,233,950 | 11/1980 | Krolski et al. | 123/630 |
| 4,236,494 | 12/1980 | Fairchild | 123/630 |
| 4,294,327 | 10/1981 | Howard | 180/273 |
| 4,622,930 | 11/1986 | Hamano et al. | 123/179 K |

*Primary Examiner*—Andrew M. Dolinar
*Attorney, Agent, or Firm*—Wheeler Law Firm

[57] ABSTRACT

A spark ignition safety circuit and starting circuit having grounding of the primary winding through safety switches and preferably also through the ignition switch. The primary winding of the ignition circuit is grounded through closed safety switches which are in series with the ignition switch.

14 Claims, 5 Drawing Sheets

SPARK IGNITION SAFETY CIRCUIT

BACKGROUND OF THE INVENTION

A spark ignition safety circuit and starting circuit having grounding of the primary winding through safety switches and preferably also through the ignition switch. The primary winding of the ignition circuit is grounded through closed safety switches which are in series with the ignition switch.

This invention relates to an ignition circuit and starting circuit for an internal combustion engine on a small motor vehicle such as a lawn mower and more particularly to a spark ignition circuit and starting circuit which is grounded through closed safety switches to improve safety and reliability of operation.

Small gasoline engines have been operated with ignition systems and distributors on multicylinder engines. Safety switches with interlocks are used to insure safety in operation and generally operate in some manner to prevent the engine from starting or to shut off the engine if a dangerous situation exists. Stopping the engine manually may be accomplished simply by pressing a grounding conductor against a spark plug which shorts out the ignition and causes the engine to stop.

A more sophisticated arrangement has been developed using a module consisting of solid state circuitry to control operation of the engine and for stopping the engine when desired. This arrangement using the module of solid state circuitry for stopping the engine has become unnecessarily complicated and requiring unnecessarily expensive components in the circuitry, and in some cases not entirely reliable.

Accordingly, the applicant has provided for a safety switch in the low voltage high current portion of the ignition circuit Essentially this operates to ground the primary coil of a magneto or a capacitor discharge spark ignition system. Preferably, one or more safety switches are connected through the ignition switch to operate the ignition system or to shut off the internal combustion engine by opening one or more of the safety switches or the ignition switch. Safety switches are also used in the starting circuit as well to prevent injury to the operator when the engine starts. The safety switch may relate to such switches as used in the transmission, more commonly known as the neutral safety switch which prevents starting of the engine if the transmission is in gear. Similarly, a power take-off safety switch is also provided when the power take-off shaft is engaged through the driving clutch which thereby would produce a live power take-off shaft if the engine should start. These switches have been used in the prior art internal combustion engines, but are not used in this manner and accordingly it is believed that the use of the safety switches and ignition switch as used in the applicant's invention provides for greater safety and improve reliability.

SUMMARY OF THE INVENTION

The Fairchild U.S. Pat. No. 4,236,494 illustrates safety switches in a ignition circuit. The circuit operates by using a portion of a coil to generate a trigger pulse applied to the thyristor to trigger conduction through the primary coil when the capacitor discharges. The switches are not connected to ground the primary coil, but connects a ground to the secondary coil which generates the spark for the spark plug. The primary coil operates in response to triggering of the thyristor which discharges the capacitor and causes the ignition system to operate.

Accordingly, the applicant's invention provides an ignition circuit and a starting circuit using safety switches in combination with the ignition switch to operate as on/off switches and control ignition and starting of the engine. The switches are in the low voltage, high current side of the ignition circuit such as the primary winding in the magneto. This simplifies the circuit and improves reliability and provides circuitry of much less costly construction since the contacts of the switch do not require precious metal as is necessary in the higher voltage switches. The operation of the circuit is improved in that it is fail-safe because the switches are closed and operative in order to operate the ignition system. Prior art systems sometimes use a switch which is open to operate the engine and this can be dangerous since if a wire becomes disconnected it would provide the same result.

It is an object of this invention to provide an ignition circuit including a primary coil for a magneto which is grounded through safety switches and the ignition switch which must be closed to complete the low voltage winding to ground.

It is another object of this invention to provide a starter relay circuit which is grounded through safety switches and provide ignition with safety switches to operate the ignition and starter circuits.

It is a further object of this invention to provide double-pole, single throw safety switches which provide grounding of the ignition circuit and grounding of the starter circuit to complete the circuits for operation of the starter relay and the ignition circuit. At least one safety switch and the ignition switch are used to provide an electric starting circuit and to operate the ignition for the internal combustion engine.

The objects of this invention are accomplished through the use of at least one safety switch and preferably an ignition switch in series to ground the ignition circuit and the starting circuit. At least one safety switch is connected in the ignition circuit to ground the primary winding of the magneto or spark generating circuit which may be operated by the battery. Grounding of the primary winding is through a safety switch such as a seat switch, power take-off safety switch, or the neutral safety switch on the transmission. The grounding is directed through these switches to assure grounding of the ignition circuit and the starting circuit. This form of grounding may be used with either starter system such as the recoil system in which the engine is manually started or the electric start system in which a starter circuit operates an electric motor to start the engine.

DRAWINGS

Referring to the drawings, FIG. 1 illustrates a recoil start system with safety switches in series with the ignition switch.

DETAILED DESCRIPTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention which is defined by the claims.

Figure 1:
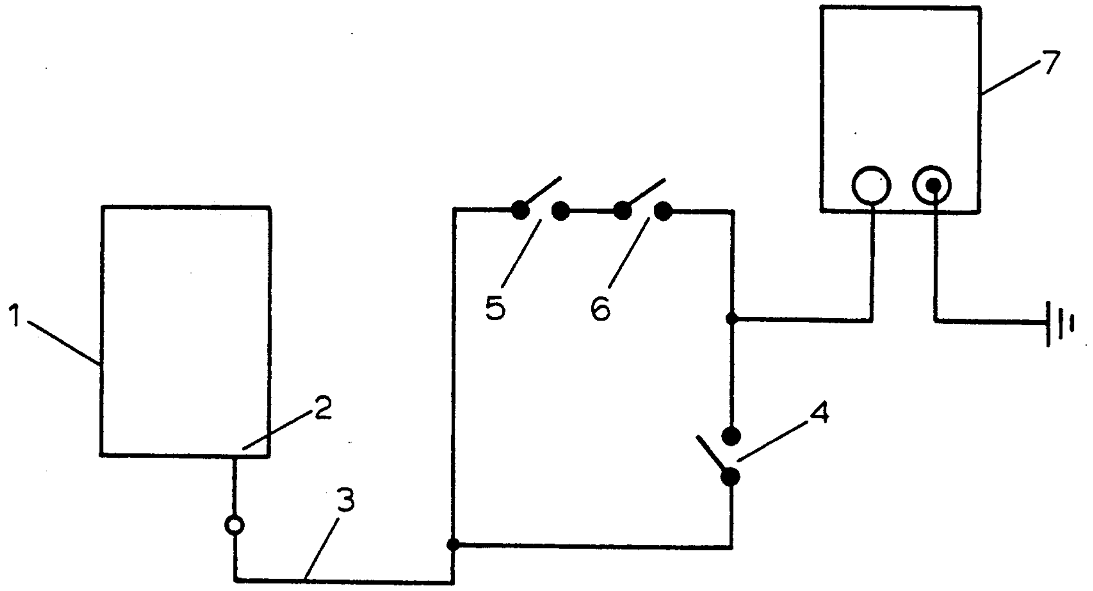

Referring to FIG. 1, the engine 1 includes a magneto 2 in which the conductor 3 of the ignition circuit is connected to the primary winding of the magneto. The conductor 3 is connected to the parallel circuit of the seat switch 4 in parallel with the PTO switch 5 and the neutral safety switch 6 for the transmission which are connected in series. This circuit is connected to the ignition switch 7 which in turn is grounded The circuit is designed to operate on a lawn mower having a recoil start. The internal combustion engine does not require an electric starter since manual means are used to start the engine. A battery is not needed since a magneto generates the electric spark in the spark plug of the ignition circuit.

Figure 2:
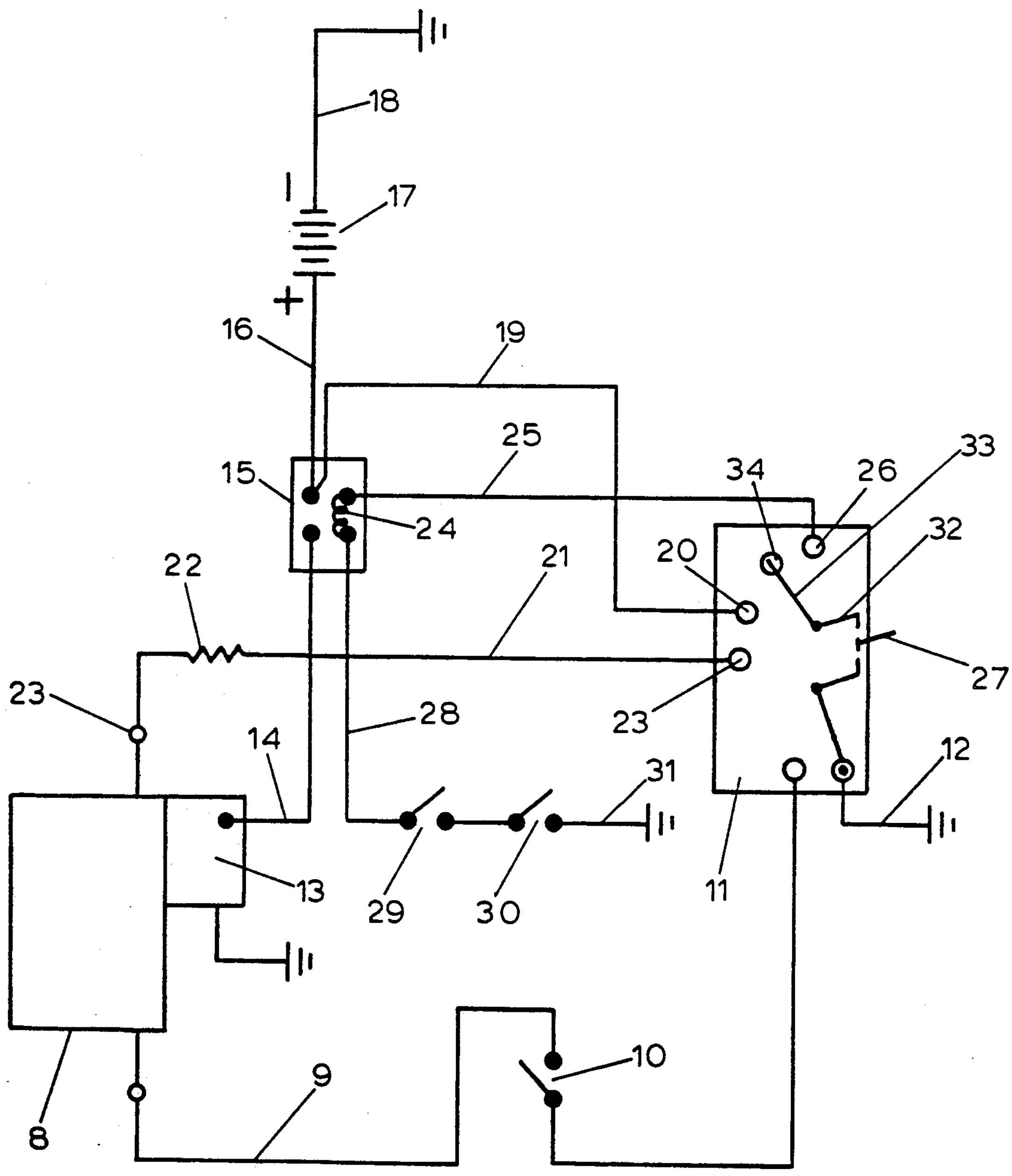
FIG. 2 illustrates a safety switch in series with the ignition switch and the primary winding in the ignition circuit and switches grounding the relay circuit of the engine start circuit.

FIG. 2 illustrates a circuit which can be used with a lawn mower having a electric starting system. The engine 8 includes a magneto of which the primary winding is connected to the conductor 9. A seat switch 10 is connected between the conductor 9 and ignition switch 11 which is grounded by the conductor 12.

The engine 8 includes a starter 13 which is connected by the conductor 14 to the relay switch 15. The relay switch 15 is connected by the conductor 16 to the battery 17 which is grounded by the conductor 18. A conductor 19 extends from the relay switch 15 to a terminal 20 in the starter switch. The conductor 21 is connected through resistor 22 to the terminal or contact 23. A suitable alternator and rectifier circuit is provided in the engine to charge the battery 17 through conductor 21 and resistor 22. The relay coil 24 is connected through the conductor 25 to the contact 26 of the starter switch 27. The relay coil 24 is also connected by the conductor 28 to the power take-off switch 29 in series with the neutral safety switch 30 for the transmission. The conductor 31 grounds the neutral safety switch. The starter switch 27 includes an arm 32 which carries a contact wiper 33 which spans the contacts 20, 34, and 26 in the start position. The arm 32 is pivoted to the left hand position to cover contacts 23, 20 and 34 in the run position of the engine.

Figure 3:
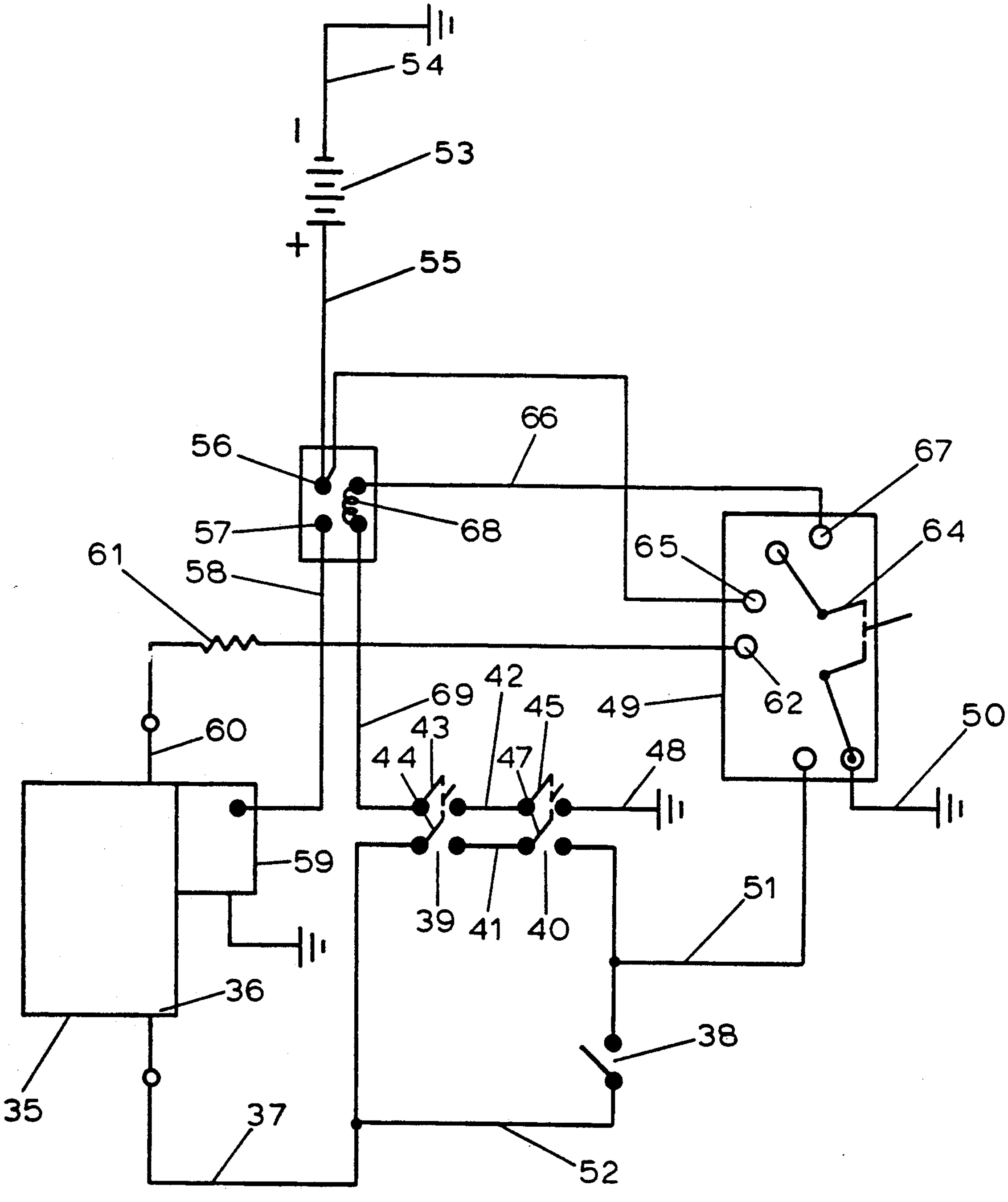
FIG. 3 illustrates the ignition circuit and a starter circuit with double pole, single throw safety switches in both the ignition circuit and the starter circuit.

Referring to FIG. 3, the engine 35 is provided with a magneto 36 of which the primary coil is connected to the conductor 37. The conductor 37 is connected to the parallel circuit consisting of the seat switch 38 which is connected in parallel with the power take-off switch 39 and the neutral safety switch 40 for the transmission. Switches 39 and 40 are double pole, single throw switches so that one switch is in the ignition circuit 41 and one portion of the switch is in the starter circuit 42. A contact wiper arm 43 operates in the ignition circuit and a contact wiper arm 44 operates in the starter circuit. Similarly, a contact wiper arm 45 operates in the ignition circuit 41 and a contact wiper arm 47 operates in the starter circuit 42. Conductor 48 grounds the switch 40 in the starter circuit.

The ignition switch 49 is grounded by the conductor 50 and the other end of the ignition switch is connected by the conductor 51 to the parallel circuit 52. The starter circuit includes a battery 53 which is grounded by the conductor 54. Conductor 55 connects the battery to a starter relay contact 56. Contact 57 of the starter relay is connected by the conductor 58 to the starter 59. The charge circuit includes the conductor 60 connected through the resistor 61 to the contact 62 of the starter switch 64. The contact 56 of the starter circuit is connected to the contact 65 of the starter switch 64. Conductor 66 is connected to the contact 67 of the starter switch 64 and also to the relay coil 68. Relay coil is connected by the conductor 69 to the power take-off switch 39.

Figure 4:
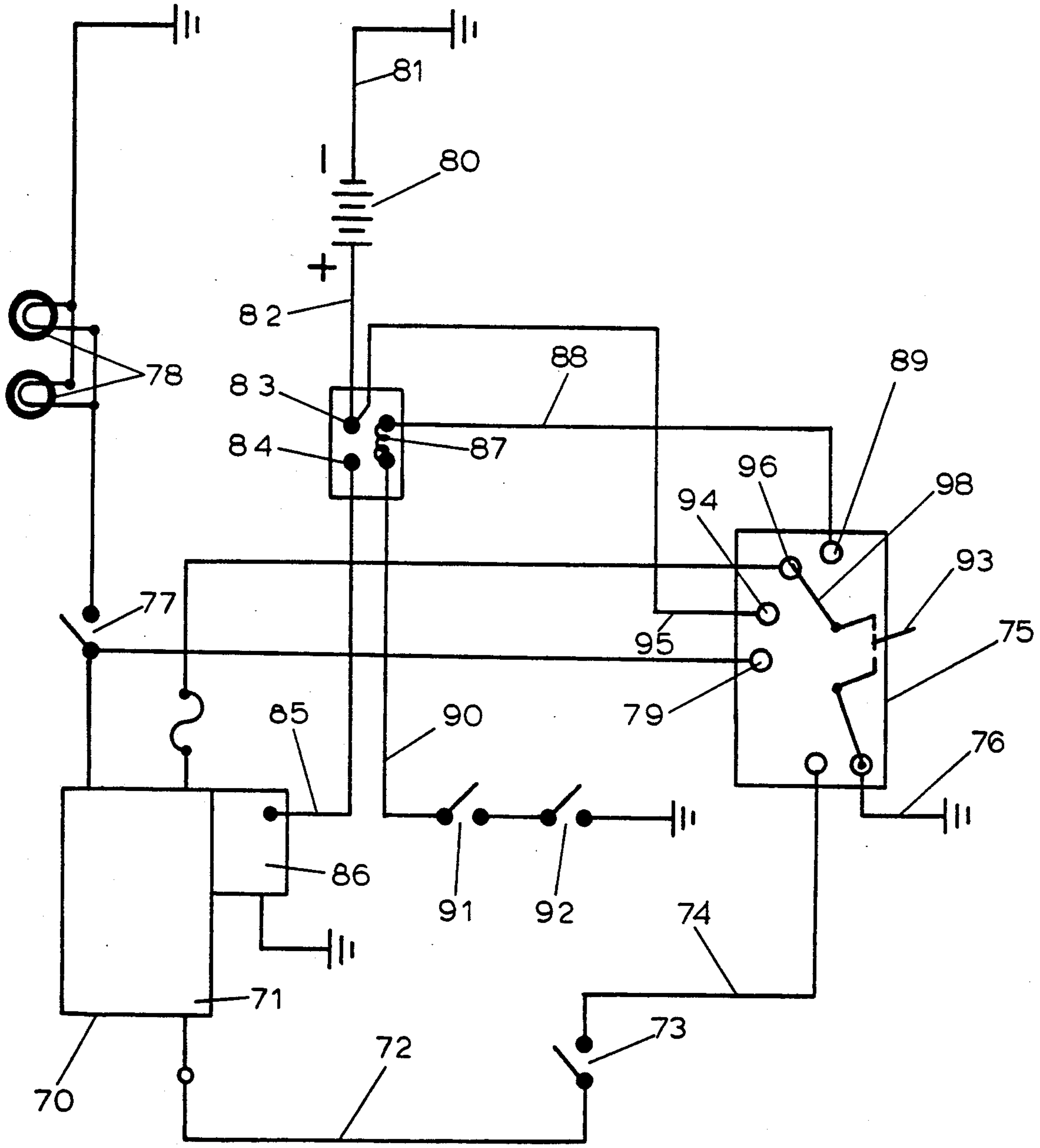
FIG. 4 illustrates the safety switches in the ignition circuit and the starter circuit together with headlights and a charging circuit for the battery.

Referring to FIG. 4, the engine 70 is provided with a magneto 71 of which the primary winding is connected to the conductor 72. Conductor 72 is connected to a seat switch 73 which is closed when the operator is sitting on the seat. Conductor 74 is connected to the ignition switch 75 which is grounded by the conductor 76. The contact 79 of the ignition switch is connected through the light switch 77 to the headlights 78.

The battery 80 is connected to ground through the conductor 81. The conductor 82 connects the battery with the contact 83 of the starter relay switch. The contact 84 is connected through the conductor 85 to the starter 86. Starter relay coil 87 is connected by the conductor 88 to the contact 89. Relay coil 87 is connected by the conductor 90 to the power take-off switch 91. The neutral safety switch 92 for the transmission is connected to the power take-off switch 91 and ground.

A starter switch includes an arm 93 carrying a contact wiper blade 98 which engages three contacts at a time. The wiper blade engages a contact 94 which is connected by the conductor 95 to the contact 83 and also connects the contact 96 and contact 89. In the left hand position the wiper blade engages contact 79, 94, and 96.

Figure 5:
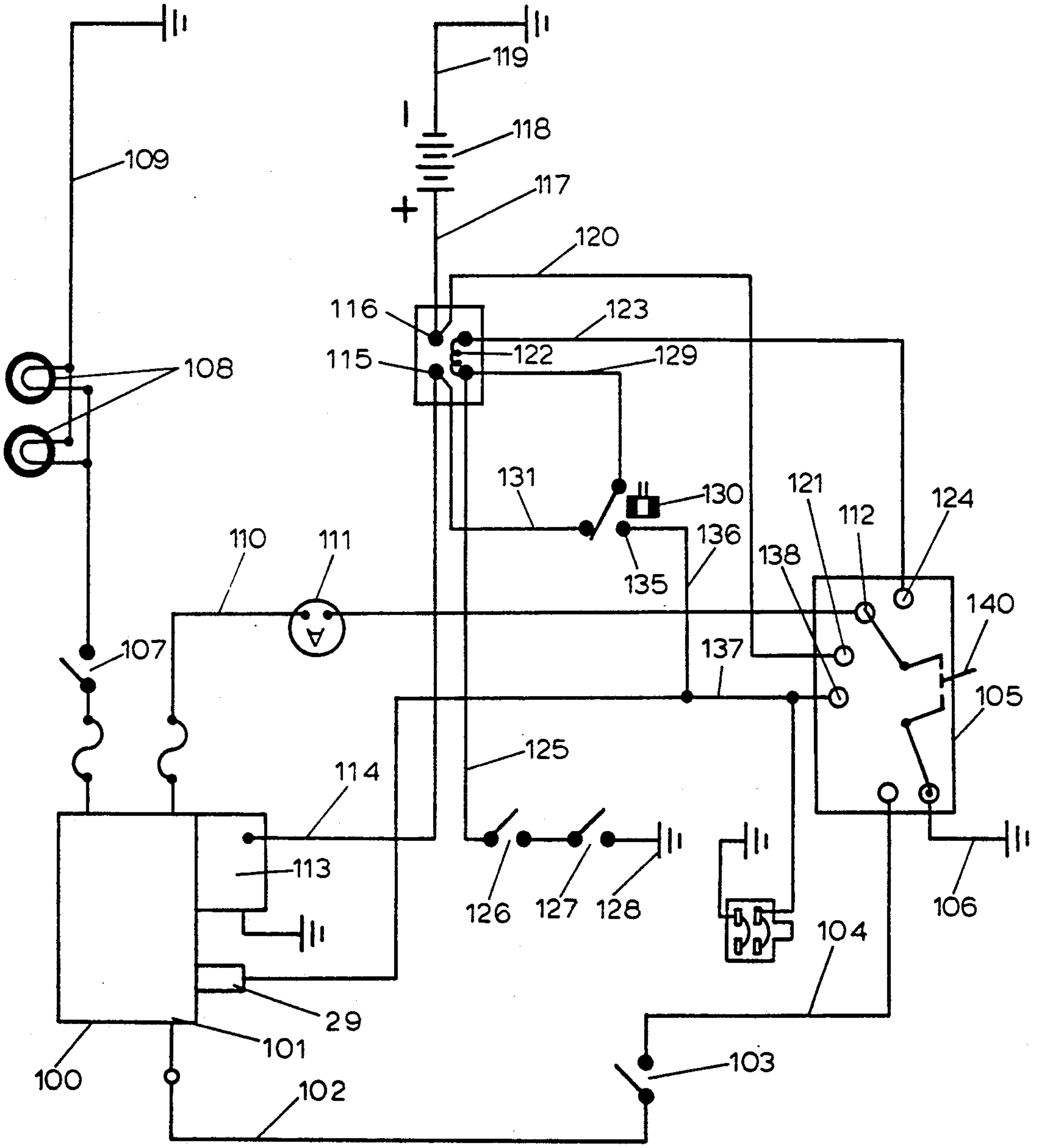
FIG. 5 illustrates the safety circuit with a safety switch in the ignition circuit and safety switches in the starter circuit and also showing headlights, a charging circuit, and a fuel solenoid for the fuel shut off.

Referring to FIG. 5 the ignition circuit and starter circuit are shown with a vehicle that has a fuel solenoid, headlights, and a charging circuit. The engine 100 is equipped with a magneto 101 of which the primary winding is connected to the conductor 102. A conductor 102 is connected to the seat switch 103 which in turn is connected through the conductor 104 to the ignition switch 105. Ignition switch 105 is grounded through the conductor 106.

The headlight switch 107 is connected to the headlights 108 for operating headlights. The opposite side of the headlights are connected through the conductor 109 to ground.

The charge circuit includes the conductor 110 connected to the amp meter 111 to the contact 112. The starter motor 113 is connected through the conductor 114 to the contact 115 in the starter relay. The contact 116 is connected through the conductor 117 to the battery 118. The battery is grounded by the conductor 119. Contact 116 is connected through the conductor 120 to the contact 121. A relay coil 122 is connected by conductor 123 to the contact 124 of the starter switch. The relay coil is also connected by the conductor 125 to the power take-off switch 126 and through the neutral safety switch 127 for the transmission to ground 128.

The coil 122 is connected by the conductor 129 to the solenoid coil 130. The coil 130 is also connected through the conductor 131 to the contact 115. Contact 135 is connected by conductor 136 and 137 to the contact 138 of the starter switch and the fuel solenoid 29. The starter switch 140 has two positions: the lower position for start, the upper position for run.

The device operates in the following described manner. FIG. 1 illustrates the basic idea used for a lawn mower with a recoil start. In other words, the internal combustion engine is started with a rope which is wound around a pulley and as it is pulled out the engine spins over and is caused to start if the ignition system is operating. The magneto of the engine 1 operates when the engine is turning over and the magneto circuit is completed to the ground through the switches between the magneto and the ignition switch. Since the engine is started by the recoil start, the operator would not be on the seat and the seat switch would be opened. Switches 5 and 6 would normally be closed and current would flow through these two closed switches and through the ignition switch 7. Accordingly, the engine would start by the grounding of the magneto in this manner. Switches 5 and 6 are switches which normally are operated manually by the control levers. The power take-off switch 5 would be closed when the PTO is in the disengaged position. Likewise the neutral safety switch 6 for the transmission would be closed when the transmission is disengaged. Accordingly, if the engine starts the power take-off would not have a live power-take-off shaft, the transmission would not be engaged, and the vehicle would not move if the engine started. If either the power-take-off or the transmission is engaged, the safety switches do not permit the engine to start.

FIG. 2 illustrates the vehicle with a electrical start system. The engine operates with magneto and when the engine is started through the electric start system the operator would be sitting on the seat and the seat switch 10 would be closed. Accordingly, the magneto would be grounded through the ignition switch when it is turned on.

If the ignition switch is closed the starter circuit is operated by the starter switch 27. To start the engine the switch is moved to the right hand position as shown in FIG. 2. In this position the electrical energy from the battery 17 flows through the switch and from the contact 20 to contact 26 and conductor 25 to the relay coil 24. If the power take-off switch is in neutral, switch 29 is closed and if the transmission is disengaged switch 30 is closed. Accordingly, the relay coil 24 is energized. If the relay coil 24 is energized relay contacts are closed and the start motor 13 will crank the engine. With cranking of the engine the engine should start because the ignition circuit is also operative.

When the engine starts the start switch is rotated upwardly to the left hand position and the battery 17 is connected to the contact 23 and the charge circuit consisting of an alternator and rectifier circuit in the engine 8 for charging.

FIG. 3 illustrates an ignition circuit and a starting circuit, essentially the same as that shown in FIG. 2 except the power take-off switch 39 and the neutral safety switch 40 for the transmission consists of double pole, single throw switches. A switch in the ignition circuit and a switch in the starter circuit are manually controlled by a single control lever. The net effect is the same as that shown in FIG. 2 except two switches are operated, one in each circuit when the switch is thrown. The engine is started by the starter 59 when the starter relay circuit is energized and when the engine is running the starter switch 64 is rotated to the upper left hand position for running.

FIG. 4 is also essentially the same as FIG. 2 and an electrical starting circuit is provided to start the engine. Likewise, an electrical starting circuit is provided in FIG. 5. The headlights are also provided as shown in these two circuit diagrams. The headlights do not provide any function which is a part of the invention but merely are a part of the electrical circuit for the lawn mower, snowblower or whatever. The internal combustion engine provides the power on whatever motor vehicle is used.

FIG. 5 shows a relay circuit for the fuel solenoid 129 in which the relay is connected through the starter relay in a manner to provide energizing of the electrical fuel solenoid in the starter position and this is automatically connected to the battery once the engine has started and the starter switch has moved to the left hand position.

The words "safety switch" in the claims include only switches that react immediately to an unsafe condition and to the ending of such a condition, without time delay. A direct ground connection excludes an intervening electronic circuit.

The embodiments of the invention in which an exclusive property or privilege is claimed are defined as follows:

1. An electrical ignition system for an internal combustion engine having current supply means having a supply side and a ground side and a circuit between said sides for carrying current in the ignition system comprising:

a spark generating circuit including primary and secondary windings, said primary winding having a direct connection to said ground side through at least one safety switch connected to said primary winding, said safety switch normally opening immediately when an unsafe condition exists and closing immediately when the unsafe condition ends, thereby controlling operation of said spark generating circuit.

2. An ignition system for an internal combustion engine as set forth in claim 1, further comprising a vehicle drivably by said engine, said vehicle having a seat, and a safety seat switch open whenever said set is unoccupied and closed whenever said set is occupied, wherein said at least one safety switch is in parallel with said safety seat switch.

3. An ignition system for an internal combustion engine as set forth in claim 1 and further comprising a vehicle having a seat power take-off and a power transmission on said engine, and said at least one safety switch being a seat switch which is open at all times when said seat is unoccupied and closed at all times when said seat is occupied, and further including a power take-off safety switch and a transmission safety switch respectively operated by a manual control lever for engaging and disengaging said power take-off and said transmission, each of said further safety switches being in the normally closed position at all times when said respective transmission and said power take-off are disengaged and in the open position at all times when the respective power take-off and transmission are engaged, said power take-off switch and said transmission switch being in series with each other and in parallel with said seat switch, whereby to complete the ground side of said ignition circuit either when said seat is occupied or when said power take-off and said transmission are disengaged, but not at any other time.

4. An internal combustion engine ignition system with a starting circuit including a current supply means having a supply side and a ground side, and having connections to said supply side and said ground side and having a plurality of safety switches and an ignition switch for control of operation of said system comprising;

a spark generating circuit including a primary and secondary winding, at least one said safety switch being connected to said primary winding and to grounding means, an ignition switch connected in series with said at least one safety switch for grounding said spark generating circuit and controlling the operation of said ignition system, a starting circuit including a relay coil and a relay switch for operating a starter, at least another said safety switch connected in series with said relay coil and directly to said ground side of said current supply means for grounding said coil, said current supply means having its supply side connected to said relay coil and said relay switch, a starter switch connected to said supply side for energizing said relay coil and operating said relay switch and said starting circuit for starting said engine.

5. An ignition system with a starting circuit for an internal combustion engine having a safety switch for controlling operation of said system as set forth in claim 4 wherein said ignition system includes a magneto.

6. An ignition system with a starting circuit for an internal combustion engine having a safety switch for control and operation of said system in claim 4 including a magneto operating a spark plug in the ignition system on the secondary winding.

7. An ignition system with a starting circuit on an internal combustion engine having a plurality of safety switches for controlling operation of said system as set forth in claim 4 wherein at least one of said plurality of safety switches is operated by a power take-off control lever and another safety switch is a neutral safety switch operated by a transmission control level.

8. An ignition system having a starting circuit for an internal combustion engine as set forth in claim 4 including at least two said safety switches comprising double pole, single throw switches with one contact of one said switch in said spark generating circuit and another contact of the one said switch in said starter circuit.

9. An ignition system having an ignition circuit and a starting circuit for an internal combustion engine comprising;

said ignition circuit including a spark generating circuit including a primary and secondary winding, and means including a safety switch and an ignition switch connected in series for directly grounding said primary winding and controlling said ignition circuit, said starting circuit including an engine starting motor, a source of electrical energy having a supply side and a ground side, a relay circuit including a relay coil and relay switch connected to said supply side of said source of electrical energy and to said starting motor, at least one additional safety switch connected between said relay coil and the said ground side of said source for directly grounding said relay coil, and a start switch connected intermediate said relay coil and the supply side of said source of electrical energy for causing said relay coil to close said relay switch thereby energizing said starting circuit for starting said internal combustion engine.

10. A system as set forth in claim 9 including a double pole, single throw switch, one pole of said double pole switch being said safety switch in the starting circuit and the other pole being said safety switch in the ignition circuit for directly grounding said ignition circuit, whereby to provide a single manual control to operate a switch in said starting circuit and a switch in said ignition circuit simultaneously.

11. An ignition system having a starting circuit for an internal combustion engine as set forth in claim 9 wherein said starter switch includes means for operating a fuel solenoid on said engine.

12. An ignition system having a starting circuit for an internal combustion engine as set forth in claim 9 wherein said safety switch is a seat switch closed by the operator sitting on the seat, said ignition switch being connected in series with said seat switch.

13. An ignition system having an ignition circuit and a starting circuit for an internal combustion engine comprising:

said ignition circuit including a spark generating circuit including a primary and secondary winding, and a safety switch and an ignition switch connected in series for directly grounding said primary winding and controlling said ignition circuit, said starting circuit including an engine starting motor, a source of electrical energy having a supply side and a ground side, a relay circuit including a relay coil and relay switch connected to said supply side of said source of electrical energy and to said starting motor, at least one additional safety switch connected between said relay coil, and a start switch connected intermediate said relay coil and the supply side of said source of electrical energy for causing said relay coil to close said relay switch thereby energizing said starting circuit for starting said internal combustion engine; said source of electrical power being a battery and said spark generating circuit further including a magneto.

14. An ignition system having an ignition circuit and a starting circuit for an internal combustion engine comprising:

said ignition circuit including a spark generating circuit including a primary and secondary winding, and a safety switch and an ignition switch connected in series for directly grounding said primary winding and controlling said ignition circuit, said starting circuit including an engine starting motor, a source of electrical energy having a supply side and a ground side, a relay circuit including a relay coil and relay switch connected to said supply side of said source of electrical energy and to said starting motor, at least one additional safety switch connected between said relay coil, and a start switch connected intermediate said relay coil and the supply side of said source of electrical energy for causing said relay coil to close said relay switch thereby energizing said starting circuit for starting said internal combustion engine; said spark generating circuit including a magneto, said secondary winding being connected for operating a spark plug.

* * * * *